United States Patent
Bullock et al.

Patent Number: 5,138,684
Date of Patent: Aug. 11, 1992

[54] HIGH-STRENGTH ISOLATED CORE CABLE

[75] Inventors: Roddy M. Bullock, San Marcos; Emile G. Sayegh, Austin, both of Tex.

[73] Assignee: W. L. Gore & Associates, Inc., Newark, Del.

[21] Appl. No.: 641,039

[22] Filed: Jan. 14, 1991

[51] Int. Cl.⁵ .................................. G02B 6/44
[52] U.S. Cl. .................... 385/113; 385/102; 385/103
[58] Field of Search ............... 350/96.20, 96.21, 96.23; 385/100, 101, 102, 103, 104, 106, 109, 112, 113

[56] References Cited

U.S. PATENT DOCUMENTS

| | | | |
|---|---|---|---|
| 4,695,127 | 9/1987 | Ohlhaber et al. | 350/96.23 |
| 5,002,359 | 3/1991 | Sayegh | 350/96.23 |

Primary Examiner—Akm E. Ullah
Assistant Examiner—Phan T. Heartney
Attorney, Agent, or Firm—Gary A. Samuels

[57] ABSTRACT

An isolated core cable for isolating a crush-sensitive core contained therein against a harsh environment, such as a fiber optic cable, a coaxial electric cable, a hydraulic line, or a pneumatic gas line, the cores therein being supported by a helically slit hard polymer tube inside a preferably braided fiber strength member. A resilient material may be wrapped around the cores inside the slit tube to further protect the cores from elongation and bending stresses.

6 Claims, 2 Drawing Sheets

HIGH-STRENGTH ISOLATED CORE CABLE

FIELD OF THE INVENTION

This invention pertains to the field of high-strength cables containing crush-sensitive cores and to structures and methods for isolating and protecting the cores therein from damage in use.

BACKGROUND OF THE INVENTION

Optical fiber transmission lines or waveguides for carrying a beam of light for carrying data or communication signals through a glass or polymer optical fiber are well known in the art. The fibers are coated with various hard and/or soft layers to aid in retaining the path for the light carrying the data or signals. The fibers must be buffered against forces which might distort them and thus mechanically interfere with their light transmitting properties.

When cables containing optical fibers are manufactured, the cables sometimes are provided with strength members to prevent excessive elongation of the optical fibers and which protect the fibers from other damage as well. Strength members, such as braided high strength polymer fiber jackets surrounding optical fibers, provide strength to the cable as it may be unreeled, pulled, strung from supports, or used as a tow cable for instruments or devices towed behind aircraft, watercraft, underwater vehicles for various uses, or used to connect units of a space station or satellite. One of the principal problems which occurs during the use of such strength members is the crushing effects under the radial load of the braid on the optical fibers contained inside the braid when such braid is put in tension, such as that created by a mass being towed. A related problem occurs when upper layers of the spooled cable crush radially the lower layers upon reeling a cable around a reel, or upon reeled optical fiber cable under load.

Solutions to the above problems are needed, solutions which isolate the sensitive optical fibers from the strength member, which decouple the fibers from the forces exerted by the strength member and thus the harsh environment.

SUMMARY OF THE INVENTION

The invention comprises an isolated core cable which isolates and protects any crush-sensitive core therein from a harsh environment, such as a fiber optic cable, a coaxial electric cable, a hydraulic line, or a pneumatic gas line. The cable comprises one or more crush-sensitive cores surrounded as a unit with a layer of resilient protective binder material, which can be depressed under load, a helically slit crush-resistant polymer tube surrounding the crush-sensitive core and the resilient binder material, and a strength member, preferably of braided fiber, surrounding the flexible crush-resistant and extensible polymer tube. The helically slit polymer tube may be provided by slitting helically a hard polymer tube, by forming a helical wrap of a strip of heat-settable polymer around the transmission lines and soft binder and heat-setting the strip in a helical spiral around the lines and binder, or by wrapping a plastic strip which has a plastic memory of a spiral form set therein, then activating that plastic memory of the strip to cause a spiral of the plastic to form around the lines and binder. An outer protective jacket of relatively easily extensible material may also be formed around the strength member. The above layers provide to the cable crush resistance, flexibility, and extensibility while maintaining the crush-sensitive core therein in an undistorted condition.

DETAILED DESCRIPTION OF THE INVENTION

The invention is now described in detail with reference to the drawings to more clearly delineate the invention. The cable of the invention is designed to alleviate one of the major problem associated with use of optical fiber cables or other crush-sensitive cores in applications where the cable is loaded on a payout reel in several layers and attached to an instrument or device to be towed behind an aircraft, a ship on the surface of water, or underwater. During deployment, the load on the cable tends to crush lower layers of cable loaded on a payout or storage reel and apply stresses to or distort the crush-sensitive cores contained in the cable. The stresses on the cores tend to cause serious loss of optical power or signal loss and/or attenuation in the case of optical fiber cores. Since a strength member of the cable will tend to stretch under load to a greater extent than is permissible for an optical fiber, the optical fibers must be decoupled from external crushing axial forces on the cable and from transverse stretch forces on the cable. The cable of this invention accomplishes that decoupling by separating the optical fibers or other cores from the strength member so that the strength member may stretch as much as needed under tension but apply no axial or radial force to the fibers or cores which are further buffered from the strength member by a wrap of soft protective material, such as a soft porous polymer tape made of, for example, porous expanded polytetrafluoroethylene or other soft porous polymer or a textile material, such as a soft cotton or synthetic fiber woven or non-woven material, or a soft light polymer foam material. The less friction and contact between the fibers or cores and the strength member of the cable the better.

Figure 1:
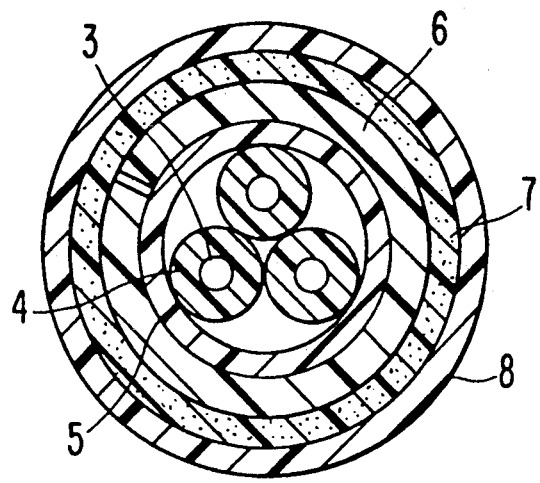
FIG. 1 describes a cross-sectional view of a cable of the invention.

As shown in FIG. 1, crush-sensitive optical fibers 3 are depicted with one or more buffering layers 4 and the optical fibers illustrated in the figure (three shown in this example) wrapped as a unit with a layer of resilient material 5.

The wrapped fibers are placed within a helically slit crush-resistant polymer tube 6 and are loose enough therein so that elongation and flexing of tube 6 may occur to some extent during use or reeling of the cable. Tube 6 may be any hard crush—resistant polymer such as polyester, polypropylene, very high molecular weight polyethylene, polyamide, or ABS (acrylonitrile - butadiene - styrene terpolymer), for example. Tube 6 may be a slit polymer tube, a strip of polymer which is spirally or helically wrapped around the soft material and optical fibers and then heat-set into the final spiral around the fibers.

Tube 6, containing the core and resilient wrap, is now placed within a strength member 7, which can be of strong organic polymer fibers to provide a strength member for the cable. Sheath 7 may be braided from Kevlar ® aromatic polyamide, Vectran ® naphthalene-based liquid crystal thermotropic polyester polyarylate fiber, GORE-TEX ® porous expanded polytetrafluoroethylene fibers, Spectra ® polyethylene fiber, or other requisitely strong non-metal or metal fibers or combinations of fibers. It may be desirable to wrap a binder of expanded polytetrafluoroethylene (not shown) around tube 6 under braided sheath 6 to reduce friction between and abrasion damage to the layers during the stretching and flexing when the cable is being used. Tube 7 may be inserted in an already formed braided sheath 7 or sheath 6 may be braided around tube 6 by an automatic braiding machine well known in the art for this purpose.

Optional jacket 8 may be wrapped or extruded around sheath 7 as an additional protection to the cable.

Figure 2:
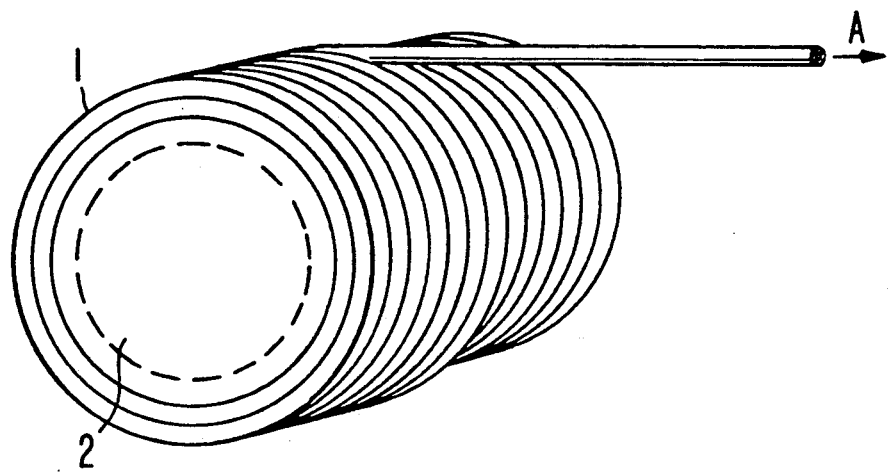
FIG. 2 shows a cable of the invention coiled on a payoff reel under tension.

FIG. 2 describes a payout reel 2 having coils of cable 1 wrapped around it for storage under tension in direction A.

Figure 3:
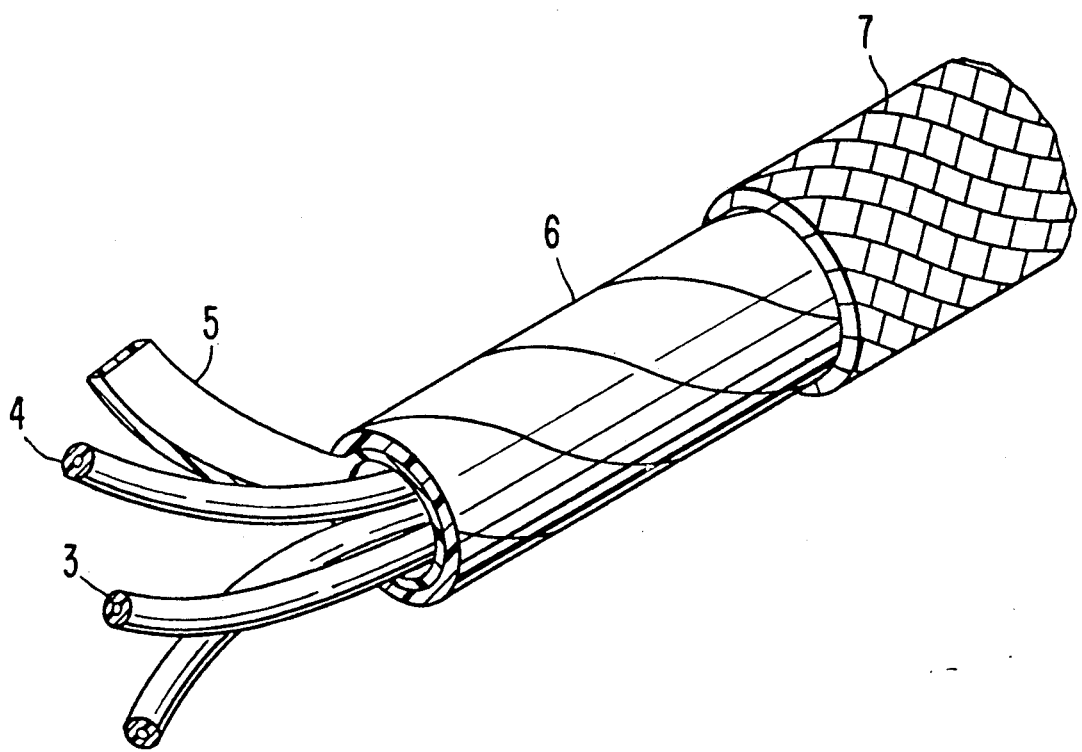
FIG. 3 discloses a partially cut away cross-sectional view of a cable with layers exposed for viewing the structural components of the cable.

FIG. 3 shows a view of cable 1 with layers partially peeled away for better viewing of cores 8 and their buffer layers 4, an end of resilient material 6 in tape form, helically slit tube 6, and braided strength member 7. Optional jacket 7 and any optional binder used between layers 6 and 7 are omitted.

Advantageously, all materials in the cable are preferably non-metal when the cores are optical fibers in that optical fibers are smaller and lighter in weight than metal conductors, have no electromagnetic interference problems associated with metal conductors, do not pose or create any lightning or other electrical hazards, and they have several times the data carrying capability of metal wires. The strength member 7 is designed to fully carry any load imposed on the cable and may stretch about 3-20% under load. The optical fibers 3 are decoupled from this load in the cable of the invention and thus do not elongate even the 1% which can cause serious damage to them. Fibers 3 are also protected by tube 6 from crushing loads on storage on a reel under tension.

The advantages of the cable of this invention as regards optical fibers apply as well to crush-sensitive coaxial electric signal cables, hydraulic lines, and pneumatic gas lines for example, or to any other useful crush-sensitive cores which might usefully be protected by a cable of this invention.

We claim:

1. A cable which isolates a crush-resistive core therein comprising:
   (a) one or more crush-sensitive cores surrounded as a unit by a layer of resilient protective binder material which can be depressed under load, said crush-sensitive core selected from the group consisting of buffered fiber optic cables, coaxial electric cables, hydraulic lines, and pneumatic gas lines;
   (b) a helically slit crush-resistant polymer tube surrounding said cores and said binder material; and
   (c) a strength member surrounding said tube.

2. A cable of claim 1 wherein said layer of resilient binder material is selected from the group consisting of porous expanded polytetrafluoroethylene, textile fiber cloth, and polymer foam.

3. A cable of claim 1 wherein said polymer tube is selected from the group consisting of polyester, polypropylene, polyethylene, polyamide, aromatic polyamide, and acrylonitrile —butadiene—styrene terpolymer.

4. A cable of claim 1 wherein said strength member comprises braided fibers selected from the group consisting of aromatic polyamide, polyester-based liquid crystal polymer, expanded polytetrafluoroethylene, and combination of the above.

5. A cable of claim 1 having a friction and abrasion reducing binder between said slit polymer tube and said braided fiber strength member.

6. A cable of claim 5 wherein said binder comprises expanded polytetrafluoroethylene.

* * * * *